RADIO CABINET AND TUNING DIAL STRUCTURE

Filed June 30, 1949 2 Sheets-Sheet 1

Inventor:
John D. Reid
By: Neden W. Redfield
Attorneys

RADIO CABINET AND TUNING DIAL STRUCTURE

Filed June 30, 1949

2 Sheets-Sheet 2

Inventor:
John D. Reid
By: Alden D. Redfield
Attorney.

Patented June 6, 1950

2,510,757

UNITED STATES PATENT OFFICE 2,510,757

RADIO CABINET AND TUNING DIAL STRUCTURE

John Drysdale Reid, Cincinnati, Ohio, assignor to Avco Manufacturing Corporation, Cincinnati, Ohio, a corporation of Delaware Application June 30, 1949, Serial No. 102,250

1 Claim. (Cl. 116—124.1)

The present invention relates to radio receivers and particularly to a novel tuning dial and indicator construction.

The primary object of the invention is to provide a compact table model radio receiver construction of such a nature that the receiver can be tuned at points on at least two sides of the cabinet. The conventional table model receivers can be tuned only from the top or the front, for example, and may not be conveniently tuned from several positions.

Another object of the invention is to accomplish such result by simple and economically constructed means which at the same time enhance the novel and aesthetic appearance of the receiver.

It is therefore an object of the present invention to provide an improved compact radio receiver having relatively large tuning and volume controls, available for more than one panel of the receiver cabinet.

A still further object of the present invention is to provide an improved compact radio receiver construction which provides a relatively large tuning dial or control for the radio receiver.

The construction in accordance with the invention is particularly advantageous when a receiver is positioned on a table between two beds, for example, or on an end table between two chairs. This construction also offers the advantage of a large tuning dial which does not impair the appearance of the receiver but in fact imparts to it a striking and appealing novelty.

In accordance with the present invention there is provided a radio receiver comprising a cabinet having openings at the front and back, a rotatable control element for said receiver mounted with its axis midway between the front and back of said cabinet, a control wheel and dial connected to said control element, said wheel and dial projecting through said openings in said cabinet whereby said control element may be adjusted from the front and back of said cabinet selectively or simultaneously.

Other and further objects of the present invention subsequently will become apparent by reference to the following description taken in conjunction with the accompanying drawings wherein.

Figure 1:
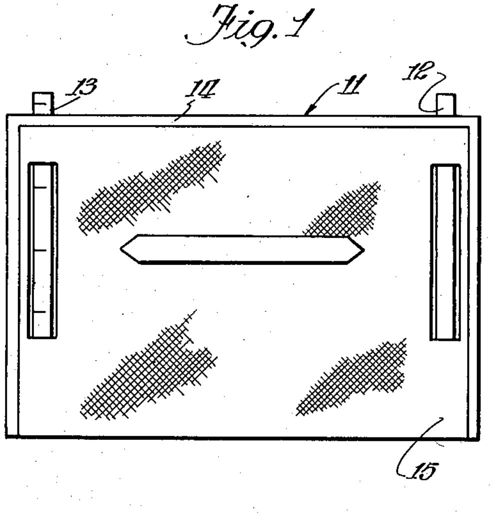
Figure 1 is a front view of a radio receiver constructed in accordance with the present invention.
Figure 3:
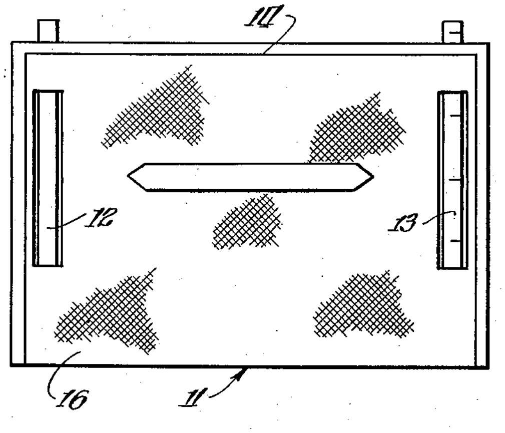
Figure 3 is a rear view of the receiver illustrated in the previous figures.
Figure 2:
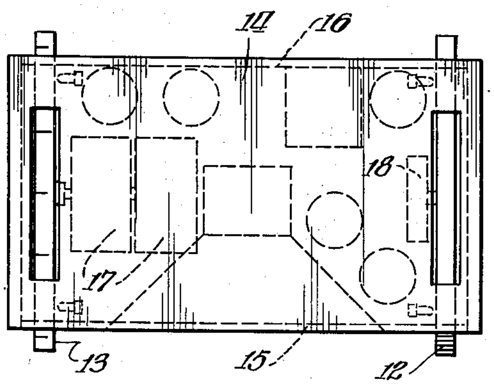
Figure 2 is the top view showing in dotted lines, certain receiver components in a receiver of the type shown in Figure 1.
Figure 4:
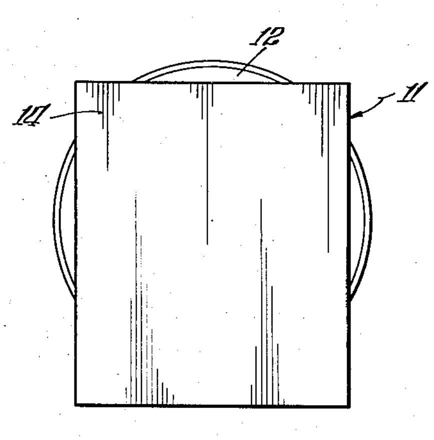
Figure 4 is an end view of the receiver shown in the previous figures.
Figure 5:
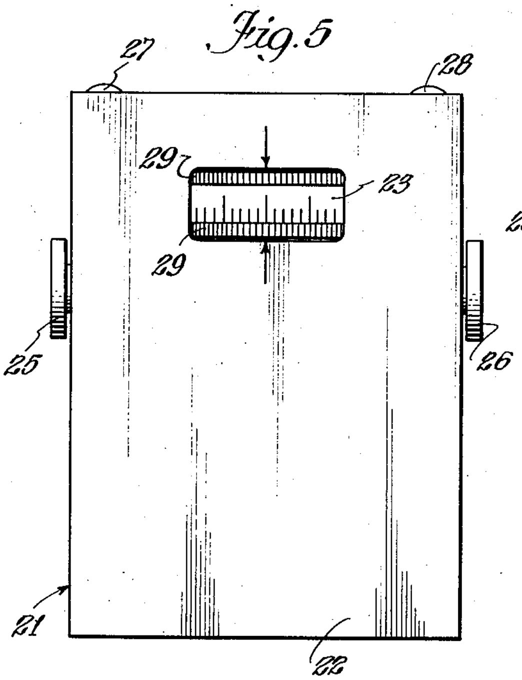
Figure 5 is a front view of another embodiment constructed in accordance with the present invention.
Figure 7:
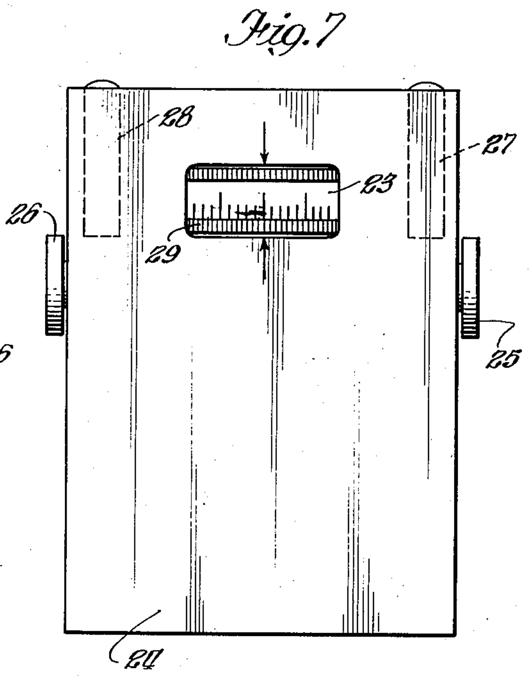
Figure 7 is a rear view of the receiver shown in Figures 5 and 6.
Figure 6:
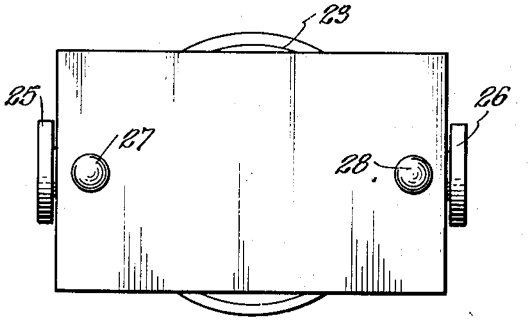
Figure 6 is a top view of the arrangement shown in Figure 5.
Figure 8:
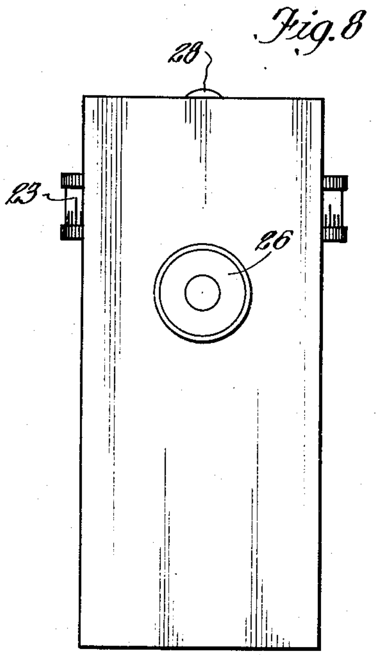
Figure 8 is an end view of the receiver illustrated in Figures 5, 6 and 7.

Referring to Figures 1, 2 and 3 of the drawing, it will be seen that there is illustrated a radio cabinet 11 having two wheel-like members 12 and 13 projecting through suitable apertures therein. The wheel-like member 12 serves to control the off and on switch and the volume control. The other wheel-like member 13 preferably is provided with suitable indicia to serve as a tuning control knob and tuning control dial. The cabinet 11 may be made of any suitable material but perhaps in accordance with present custom the cabinet would be formed of a plastic material. Thus, the two ends and top of the cabinet would be formed in one piece 14. The top 15 would be provided with two apertures for the wheels 12 and 13 and would be secured to the member 14. Likewise, the rear of the cabinet, 16 would have a configuration similar to the front 15 and also would be provided with suitable apertures for permitting the wheels 12 and 13 to project therethrough.

From Figure 2 it will be noted that the tuning control and dial 13 is connected to a suitable tuning control element such as a variable capacitor 17. The control 12 is connected to a combined volume control and switch 18.

The control wheels and dials 12 and 13 may be actuated from the top, front, rear or ends of the cabinet. It will be remembered that the cabinet 11 is relatively small since the radio is of the personal compact or portable type. Hence the wheels 12 and 13 are each of such diameter that the hand can span the wheel 12 so as to contact it at two or three points. Such control of either of the control elements 12 or 13 provides for relatively accurate and fine control. This obviates the objection heretofore encountered in small compact receivers where it is necessary to manipulate relatively small knobs which could be grasped only between two fingers. While reduction gear devices have been employed for the tuning controls of some of the compact receivers, nevertheless this reduction either was not sufficient or the expense involved in providing a reduction gear arrangement was such, that certain inaccuracies were inherent in the resultant pattern so that accurate tuning was substantially impossible. The inherent backlash or lost motion is particularly annoying when it is remembered that the signal energy received by a receiver of this kind is usually relatively small, due to the small self-contained loop antenna provided. Thus, in order to obtain reception of anything other than a relatively powerful station, the more common type of constructions have been decidedly lacking in providing reasonably good tuning controls.

While the construction illustrated in Figures 1 to 4 shows a receiver having a cabinet with its greatest dimension in a horizontal direction, the same principles of the present invention may be applied to a radio receiver having its greatest dimension in a vertical direction. This is illustrated in the embodiment shown in Figures 5 to 8 inclusive. In these figures of the drawings, it will be seen that there has been provided a cabinet 21 having a front panel 22, provided with a suitable aperture through which a tuning control and dial 23 projects. In similar manner the rear panel 24 is provided with an aperture so that the tuning control and dial 23 may be provided a control knob 25 for the off and on switch and the volume control.

On the other end of the cabinet 21 there may be provided another knob 26 where a tone control is incorporated in the receiver. The volume control 25 and tone control 26 may be arranged to vary the intensity of light or the color of light viewed from a plurality of clear plastic rods having their upper extremities dome shaped and projecting from the top of the cabinet 21. Thus in effect a pilot light 27 is provided for, indicating the relative position of the volume control 25 and another pilot light 28 is provided for indicating the position of the tone control 26.

From the arrangement illustrated in Figures 5, 6, 7 and 8, it again appears that a relatively large tuning control and indicator is provided which is accessible from both the front and back of the radio cabinet. This construction provides for maximum visibility and the greatest accuracy in tuning as compared to other types of construction. It also will be noted that the tuning dial and control consists of the indicia portion 23 between two serrated or knurled wheels 29 which may be engaged by the fingers for controlling the tuning. It, of course, will be appreciated from the construction illustrated in the previous figures, that the tuning indicator 13 could be of a similar construction and that the indicia need not be inscribed on the wheel which is engaged by the fingers.

While for the purpose of illustrating and describing the present invention certain preferred embodiments have been illustrated in the drawings, it is to be understood that the invention is not to be limited thereby since such variations in the components employed and in their arrangement are contemplated as may be commensurate with the spirit and scope of the invention as set forth in the accompanying claim.

What I desire to protect by United States Letters Patent is claimed as follows:

In a portable radio receiver, the combination of a cabinet geometrically formed as a parallelepiped comprising a front panel, a rear panel, a top panel and a pair of side panels, said cabinet being formed with a first set of three oblong openings individually located in the front, top, and back panels in proximity to one of said end panels, and a second set of oblong openings in the front, top and back panels and near to the other end panel, all of the openings of said first set having their major axes in a common vertical plane in proximity to the first side panel, all of the openings of the second set having their major axes in a common vertical plane in proximity to the other end panel, a rotatable tuning control element for said receiver mounted with its horizontal axis equidistant from the first set of said openings and parallel to said front and top and back panels, a rotatable volume control element for said receiver mounted with its horizontal axis equidistant from the second set of said openings and parallel to the front and top and back panels, a manually operable circular combined tuning control wheel and dial having a diameter greater than the width of said cabinet and axially secured to the tuning control element for rotation therewith, and a manually operable circular combined volume control wheel and dial having the same diameter as the first-mentioned control wheel and dial and axially secured to said volume control element for rotation therewith, each of said combined control wheel and dial members having arcuate segments symmetrically projecting through its respective set of said openings, whereby said control elements may be adjusted from the front, top, and back of said cabinet, the diameter of each of said combined wheel and dial members being on the order of four inches and not exceeding the normal grasping span of the adult hand.

JOHN DRYSDALE REID.

REFERENCES CITED

The following references are of record in the file of this patent:

UNITED STATES PATENTS

| Number | Name | Date |
|---|---|---|
| 1,701,377 | Langley | Feb. 5, 1929 |
| 1,919,043 | Roth | July 18, 1933 |
| 2,457,029 | Brockway | Dec. 21, 1948 |

FOREIGN PATENTS

| Number | Country | Date |
|---|---|---|
| 22,301 | Netherlands | Aug. 15, 1930 |
| 662,542 | Germany | July 15, 1938 |